United States Patent [19]

Miloslavsky

[11] Patent Number: 5,991,395
[45] Date of Patent: Nov. 23, 1999

[54] IMPLEMENTATION OF CALL-CENTER OUTBOUND DIALING CAPABILITY AT A TELEPHONY NETWORK LEVEL

[75] Inventor: Alec Miloslavsky, Hillsborough, Calif.

[73] Assignee: Genesys Telecommunications Laboratories, Inc., San Francisco, Calif.

[21] Appl. No.: 09/095,732

[22] Filed: Jun. 10, 1998

Related U.S. Application Data

[63] Continuation-in-part of application No. 08/964,309, Nov. 4, 1997, and a continuation-in-part of application No. 08/968,825, Nov. 14, 1997.

[51] Int. Cl.⁶ .................................................. H04M 3/42
[52] U.S. Cl. ..................... 379/265; 379/207; 379/266; 379/355
[58] Field of Search ................................ 379/265, 266, 379/219, 220, 221, 309, 207, 355, 356, 201

[56] References Cited

U.S. PATENT DOCUMENTS

| | | | |
|---|---|---|---|
| 5,179,589 | 1/1993 | Syu | 379/265 |
| 5,291,552 | 3/1994 | Kerrigan et al. | 379/266 |
| 5,299,259 | 3/1994 | Otto | 379/221 |
| 5,343,518 | 8/1994 | Kneipp | 379/355 |
| 5,425,093 | 6/1995 | Trefger | 379/266 |
| 5,436,965 | 7/1995 | Grossman et al. | 379/266 |
| 5,467,391 | 11/1995 | Donaghue, Jr. et al. | 379/265 |
| 5,495,523 | 2/1996 | Stent et al. | 379/265 |
| 5,544,220 | 8/1996 | Trefzger | 379/266 |
| 5,590,188 | 12/1996 | Crockett | 379/225 |
| 5,621,790 | 4/1997 | Grossman et al. | 379/266 |
| 5,633,924 | 5/1997 | Kaish et al. | 379/266 |
| 5,796,791 | 8/1998 | Polcyn | 379/265 |
| 5,889,799 | 3/1999 | Grossman et al. | 379/266 |

Primary Examiner—Scott Wolinsky
Attorney, Agent, or Firm—Central Coast Patent Agency; Donald R. Boys

[57] ABSTRACT

A system (33) for outbound dialing for call centers (11) place an outbound dialer (21) at network level (13), and client call centers provide destination number calling lists. The outbound dialer (21), upon completing a call to a destination number, connects the completed call to a routing point at a client call center. The system (33) may be CTI-enhanced, and can be hosted by a client of a network provider, or by the network provider. Clients may subscribe to the network provider for service, providing calling lists and routing points, and completed calls may be routed to call centers operated by different clients. The architecture and method of the system (33) minimizes the number of leased lines required by each call center taking advantage of the system (33).

13 Claims, 2 Drawing Sheets

IMPLEMENTATION OF CALL-CENTER OUTBOUND DIALING CAPABILITY AT A TELEPHONY NETWORK LEVEL

CROSS-REFERENCE TO RELATED DOCUMENTS

The present invention is related as a Continuation-in-Part (CIP) to copending application 08/964,309, filed Nov. 4, 1997, and also as a CIP to copending application 08/968,825, filed Nov. 14, 1997.

FIELD OF THE INVENTION

The present Invention is in the field of telecommunications and pertains more particularly to methods of implementing out bound dialing capability for a call center.

BACKGROUND OF THE INVENTION

Telephone call processing and switching systems are, at the time of the present patent application, relatively sophisticated, computerized systems, and development and introduction of new systems continues. Much information on the nature of such hardware and software is available in a number of publications accessible to the present inventors and to those with skill in the art in general. For this reason, much minute detail of known systems is not reproduced here, as to do so may obscure the facts of the invention.

At the time of filing the present patent application there continues to be remarkable growth in telephone-based information systems. Recently emerging examples are telemarketing operations and technical support operations, among many others, which have grown apace with development and marketing of, for example, sophisticated computer equipment. More traditional are systems for serving customers of large insurance companies and the like. In some cases organizations develop and maintain their own telephony operations with purchased or leased equipment, and in many other cases, companies are outsourcing such operations to firms that specialize in such services.

A large technical support operation serves as a good example in this specification of the kind of applications of telephone equipment and functions to which the present invention pertains and applies, and a technical support organization will be used from time to time in the current specification for example purposes. Such a technical support system, as well as other such systems, typically has a country-wide or even world-wide matrix of call centers for serving customer's needs. Such call center operations are more and more a common practice to provide redundancy and decentralization. However, the components of the present specification can apply to a single call center as well.

In a call center, a relatively large number of agents handle telephone communication with callers. Each agent is typically assigned to a telephone connected to a central switch, which is in turn connected by one or more trunk lines to a publicly-switched telephone network (PSTN), well-known in the art. The central switch may be one of several types, as known in the art.

An organization having one or more call centers for serving customers typically provides one or more telephone numbers to the public or to their customer base, or both, that may be used to reach the service. The number or numbers may be published on product packaging, in advertisements, in user manuals, in computerized help files, and the like. There are basically two scenarios. If the organization providing the service has a single call center, the number will be to the call center, and all further routing to an agent will be at the call center. If there are several call centers, the organization may provide several numbers, one for each call center, and the customer may be expected to use the number for the closest center, or for the center advertised to provide specifically the service he or she might need. In some cases the number provided will connect the caller with a first Service Control Point (SCP) which is adapted to pre-process incoming calls and forward the calls to other call centers.

Routing of calls, then, may be on several levels. Pre-routing may be done at SCPs and further routing may be, and almost always is, accomplished at individual call centers. As described above, a call center typically involves a central switch, which may be, for example, an Automatic Call Distributor (ACD), Private Branch Exchange (PBX), or a public-switched telephone network (PSTN) switch. The central switch is connected to the PSTN network, well-known in the art. Agents, trained (hopefully) to handle customer service, man telephones connected to the central switch. This arrangement is known in the art as Customer Premises Equipment (CPE).

The processes of incorporating computer enhancement to telephone switches is known in the art as Computer Telephony Integration (CTI), and the hardware used is referred to as CTI equipment. Such equipment includes processors, routers, servers and the like. It is this processor that provides the CTI enhancement for the call center.

More recently, call centers have been enabled to handle data network telephony (DNT). DNT equipped centers operate similarly to conventional CIT centers in function although the operations such as routing calls, switching lines, queuing calls, and so on, are performed digitally with digital equipment rather than with an analog requirement. In DNT, calls are received at each agent's computer terminal or DNT communication device. For the purpose of this specification, a CTI system will most often be referred to when describing elements of the present invention although they will apply to DNT as well.

In a CTI system telephone stations connected to the central switch may be equipped also with computer terminals, so agents manning such stations may have access to stored data as well as being linked to incoming callers by a telephone connection. Such stations may be interconnected in a network by any one of several known network protocols, with one or more servers also connected to the network one or more of which may also be connected to a processor providing CTI enhancement, also connected to the central switch of the call center.

Typically, call centers are manned by agents connected by telephone and trained to handle certain problems experienced by customers such as questions regarding complicated installations of software and so on. Another instance might be a large sales network wherein the agent is trained to take customer orders and the like. Generally, agents who are employed to operate in such a call center work on site and must log-in and be counted present so that calls can be routed to that particular agent.

In typical call center operations agents are primarily engaged in handling incoming calls from persons seeking services provided by the call center. This is not, however, the only task agents handle. In many instances there is a need for agents to make outgoing calls. An agent, for example, in interaction with a calling party, may need to research some item of information, then place a call back to the original caller. In other instances the primary function of the call center may be agent-initiated calls (sales, marketing for example). In any case, there are often reasons for agents taking part in calls originated at the call center, in addition to their other duties.

In the operation of call centers wherein calls are placed from the call center, it is known in the art to make such calls by an automatic outbound dialing system, wherein calls placed by the dialing system are answered by clients and then transferred quickly to available agents.

In most call centers, as previously described, an automatic dialer within the call center handles outbound dialing functions for the agents. In those call-centers wherein outbound calls are more prevalent, sufficient outbound channels (phone lines) must be provided to the call center so that the outbound dialer has enough channels available to keep every agent busy handling connected calls.

Because outbound dialing is automatic and a significant number of outbound calls will result in failure to connect to a real person, the hit ratio is always less than 1. If one automatically dialed outbound call is answered by a real person for every two calls made, for example, the hit ratio is 0.5.

The outbound dialer must have access to a sufficient number of channels so that connected calls may be transmitted to agents in a manner so as to keep them fairly engaged in taking calls. Therefore, at least two lines dedicated to placing outbound calls by the automatic dialer would be needed if the hit ratio is 0.5.

The outbound channels used by the automatic dialer at a customer's premise have to be assigned, leased lines. The cost, then, for the sponsor of the call center, in terms of payment for total lines, can be very significant.

In order to avoid the extra expense related to extra lines required for outbound dialing, many companies prefer to limit outbound dialing capability as much as possible. However, many businesses cannot do this as outbound calls may be key to their success. Very little has been done in the art at the time of the present application, however, to efficiently manage agent activity in handling outbound calls.

What is clearly needed is a method and apparatus wherein outbound calls can be made in automated fashion from an automatic dialing system at network level, transparent to the agent, and calls connected can be distributed efficiently among available agents. An outbound dialer such as this would require only one dedicated channel per agent at a call center, thus significantly reducing cost related to the leasing of extra lines.

SUMMARY OF THE INVENTION

In a preferred embodiment of the present invention an outbound dialer system is provided, comprising an automatic call dialer in a network having a network provider, the call center having capability of placing calls to pre-stored destination numbers; circuitry for recognizing a call answered by a person; and a calling list of destination numbers. The dialer places calls to the pre-stored destination numbers, and upon a call being answered by a person, connects the completed call to a routing point in a remote call center. The network may be a publicly-switched telephone network (PSTN), or other wide area network (WAN).

In some cases the outbound dialer is sponsored by a single organization, and all connected calls are connected to the same routing point at the call center. In other cases the system further comprises a computer-telephony integration (CTI) processor, wherein the outbound dialer is sponsored by a single organization having a plurality of call centers, and completed calls are connected to routing points at individual ones of the plurality of call centers based on pre-stored routing criteria. A variety of routing criteria may be used, such as load-balancing and the like.

In some cases the system may be operated by the network provider. In this case the system further comprises a plurality of calling lists provided by a plurality of client organizations having call centers, and the system places outbound calls based on different calling lists, connecting completed calls to call centers operated by the client organizations providing the calling lists.

In another aspect of the invention a call center system is provided, comprising a call center having a call-switching apparatus connected to a telephone network by at least one multi-channel telephony trunk line, and a plurality of agent stations having telephones connected by station-side ports to the call-switching apparatus; and an outbound dialer in the network having a network provider, the outbound dialer having capability of placing calls to pre-stored destination numbers, circuitry for recognizing a call answered by a person, and a calling list of destination numbers. The dialer places calls to the pre-stored destination numbers, and upon a call being answered by a person, connects the completed call to a routing point in the call center. The network in this case a swell may be a publicly-switched telephone network (PSTN). The dialer may be sponsored by a single organization having one or a plurality of call centers, or may be hosted by the network service provider serving a variety of clients as a subscription service.

In another aspect a method for practicing the invention is provided, comprising steps of (a) placing outbound calls by an automatic dialer in a network servicing the call center, according to destination numbers provided by the call center; (b) determining when a call is answered by a person; and (c) connecting answered calls to a routing point at the call center.

The system according to various embodiments of the invention minimizes the number of leased lines a call center has to have to keep a set of agents busy, and by so doing, minimizes the cost of operating a call center operating at least partially on placing outgoing calls to destination numbers. Objects of the invention are more fully explained below, and enabling embodiments of the invention are taught.

BRIEF DESCRIPTION OF THE DRAWING FIGURES

DESCRIPTION OF THE PREFERRED EMBODIMENTS

Figure 1:
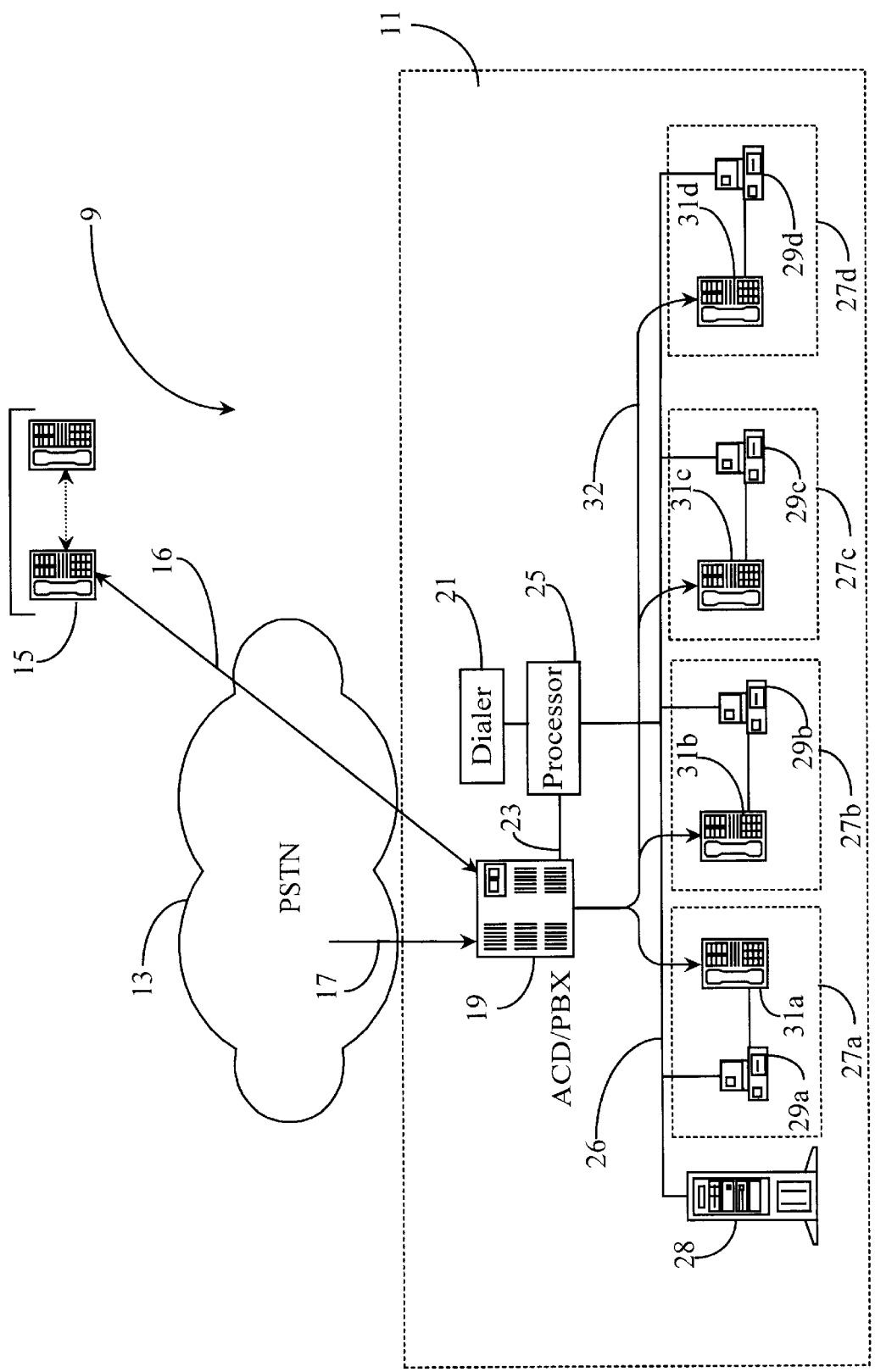
FIG. 1 is an overview of a typical call center utilizing outbound dialing according to current art.

FIG. 1 is an overview of a typical call center 11 in a telephony system 9 utilizing outbound dialing according to current art. Call center 11 comprises a telephony switching apparatus 19 connected in this embodiment to a computer-telephony integration (CTI) processor 25 via CTI link 23. CTI processor 25 provides computerized functions for switch 19, and is capable of both monitoring switch activity and controlling switch activity. Switch 19 may be an automatic call distributor (ACD), a private branch exchange (PBX), or another type of telephony switch such as known in the art, having a CTI interface.

Switch 19 is connected via a telephone wiring system 32 to agent workstations 27*a*–27*d* from station-side ports. Each workstation 27*a*–*d* comprises a personal computer/video display unit (PCIVDU) and a switch-connected telephone such as PC/VDU's 29*a*–29*d* and telephones 31*a*–31*d* respectively. Workstations 27*a*–*d* share a connection through their PC/VDU's to a local area network (LAN) 26. LAN 26 also has connected thereto a data server 28 for storing and providing data to CTI processor 25 and to PC/VDUs at agent's stations.

Incoming calls to agents at call center 11 arrive from, in this example, a publicly switched telephone network (PSTN) 13 via incoming trunk 17. In other embodiments the network may be a corporate wide-area network (WAN) or other WAN.

In the example of FIG. 1 an outbound dialer 21 is linked to CTI processor 25 which is both switch- and LAN-connected. Outbound dialer 21 is automatic and operated by software according to a predetermined protocol. Outbound dialer 21 may reside separately as illustrated, or may reside in switch 19 or processor 25. It is shown as a separate unit here solely for the purpose of clarification.

Outbound dialer 21 places calls to clients 15 over an outbound trunk 16 which comprises telephony channels from switch 19 into PSTN 13. In this example the channels of trunk 16 are dedicated to outbound dialing. Trunk 16 in this example comprises at least double the number of channels as the number of agents who are actively logged onto the system for reasons as previously described with reference to the background section. That is, that many calls are not answered, others are picked up by automatic systems and the like, and only a portion are actually answered by person.

One with skill in the art will appreciate that many agents may be present and active in a very large call center requiring significant trunking architecture to effect efficient outbound dialing. The example presented here shows only 4 agents, but is deemed sufficient by the inventor for the purpose of illustrating basic call-center functionality. There are, as well, functional elements that are well known to be present in typical call-center architecture that are not illustrated here. These elements may include customer information system servers (CIS), interactive voice response units (IVR), Routers, Stat-Servers, and other such components. Such conventional elements may be assumed to be present in embodiments of the present invention.

Figure 2:
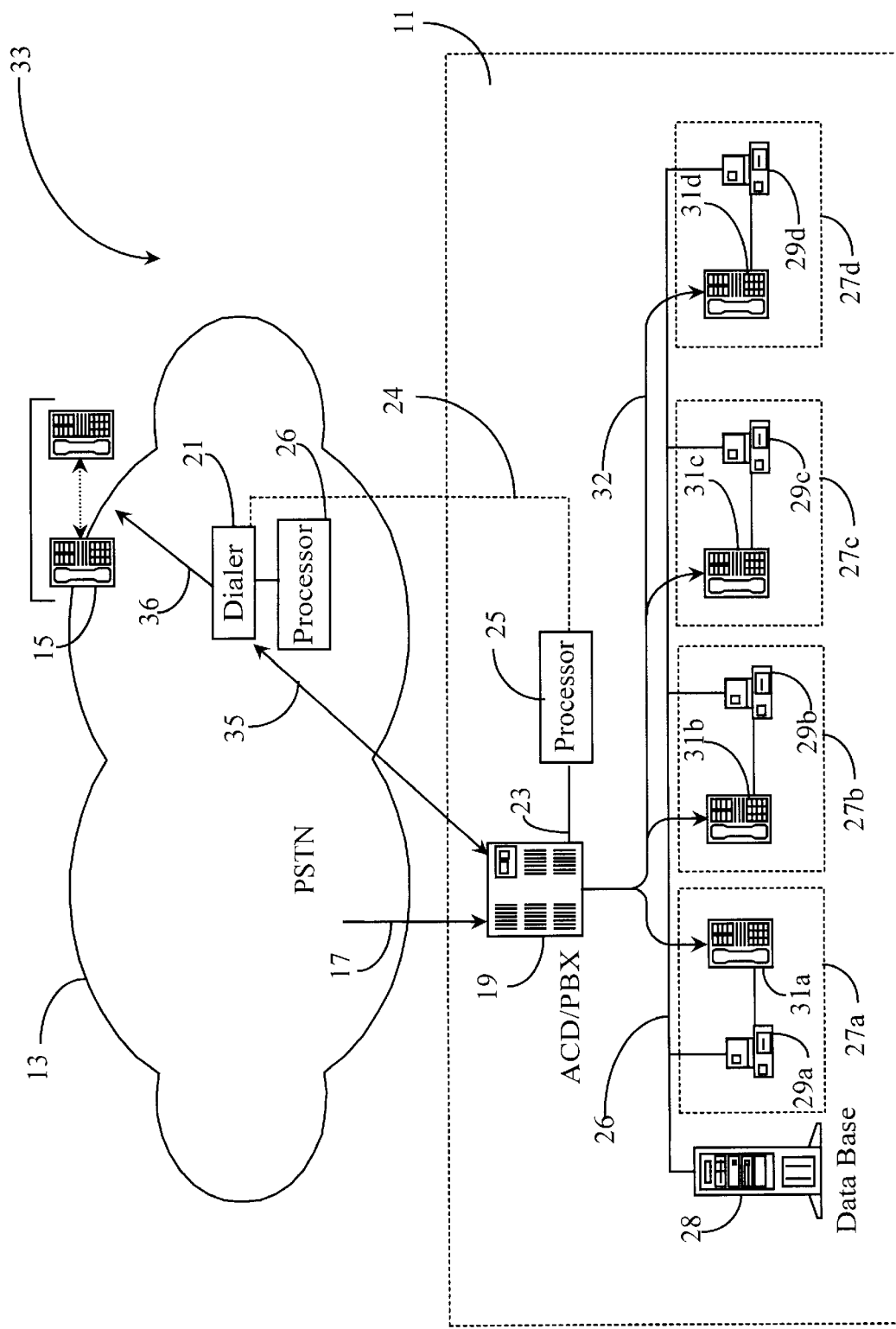
FIG. 2 is a simple overview of a call center utilizing outbound dialing according to an embodiment of the present invention.

FIG. 2 is an overview of a call center utilizing outbound dialing according to an embodiment of the present invention, wherein the outbound dialing finction resides at the network level. Telephony communications system 33 comprises many of the same elements described above with reference to FIG. 1. Therefore, elements of FIG. 2 that remain the same in function are shown with the same element numbers and will not be reintroduced. Outbound dialer 21 in this embodiment operates in the PSTN, and is supported by a CTI processor 26, which may be the same as, or similar to, CTI processor 25 at the call center. In other embodiments processor 25 may have a digital link 24 (shown as a dotted line, indicating optional) to dialer 21 in the network, and processor 26 may not be needed.

The innovative technique of providing outbound dialing at the network level allows fewer dedicated lines to be employed between switch 19 and PSTN 13. For example, trunk 16 of FIG. 1 (prior art) must maintain at least 8 outbound channels to accommodate agents at workstations 27*a*–*d*, assuming a ration of 1 out of two outbound calls being answered by a person. This high number of lines (channels) needed for the purpose of placing the outbound calls all have to be paid for. However, implementing dialer 21 at the level of PSTN 13 allows an inbound trunk 35 (FIG. 2), consisting of substantially the same number of channels as number of active agents, to be used, keeping all agents busy, because the outbound dialer now needs but one line per active agent to route connected calls.

In a preferred embodiment the outbound dialer at network level places calls to destination numbers provided by one or more call-center hosts. When a call is answered by a person, the call is connected to a routing point at the pertinent call center. The call is then routed to an agent according to any routing rules in force at the call center. These routing rules may be relatively sophisticated, incorporating agent skill level and the like, or may be on the basis of an Automatic Call Distributor (ACD) as known in the art. In some minimal embodiments calls may be dialed through directly to agents.

In alternative embodiments the routing functions may be at network level as well, including ACD or more sophisticated routing, in which case connected calls accomplished by the outbound dialer at network level may be directed to agents stations rather than to a routing point at a call center. In other embodiments ACD at the network level may accomplish routing to secondary routing points at call centers based on availability and/or loading, and further routing is then accomplished at the call center routing point.

In one embodiment of the present invention, the outbound dialing capability is hosted by the network provider, and offered to companies (clients of the network provider) hosting call centers as a subscription service. A company hosting several distributed call centers can now share costs with other similar companies via the fact that all outbound calls are shared over network lines. In this way, the cost for the service will be substantially less than each company maintaining their own outbound dialing systems within their own call centers. If there is no cost for busy or failed connections as is the case with most shared public lines, costs may be reduced even further.

In another embodiment of the present invention, routers are distributed within PSTN 13 with each router associated with a separate call center that may be hosted by one or more companies. The same outbound dialing system could accommodate all of the call centers.

In yet another embodiment of the present invention, scaled-down versions of the outbound dialing system could be distributed so that each call center connected to a distributed router would have it's own outbound dialer.

A DNT application has routing nodes in a digital data network instead of routers as known in connection-oriented, switched systems, analog to digital conversion is employed, and WAN access is provided. A combination DNT/CTI outbound dialing system is also provided as one possible architecture adapted for converting analog to digital and vice versa. In this way DNT call centers and CTI call centers may subscribe to the same service. The service in some embodiments is offered by a third party telecommunications company, in others by the local telephone company, or perhaps, may be set-up as a joint venture involving several companies hosting call centers as a way to share and reduce costs.

It will be apparent to one with skill in the art that by placing outbound dialing capability within the telephone network, significant savings can be realized by individual companies maintaining call centers. It will also be apparent to one with skill in the art that by utilizing distributed architecture within the network, that costs may even be further reduced due to sharing of the network lines.

The spirit and scope of the present invention is limited only by the claims that follow.

What is claimed is:

1. An outbound dialer system comprising:

an automatic call dialer implemented and operated at network level by a network provider, the automatic call dialer having the capability of placing calls selected from one or more stored lists of destination numbers provided by one or more clients of the network provider; and circuitry for recognizing that at least one of said placed calls is answered by a person;

wherein the dialer places said calls to the selected destination numbers, and upon one of said placed calls being answered by a person, connects the answered call to a routing point in a remote call center hosted by a client of the network provider.

2. The outbound dialer system of claim 1 wherein the network is a publicly-switched telephone network (PSTN).

3. The outbound dialer system of claim 1 wherein the outbound dialer system is hosted by a single client of the network provider, and all calls completed to persons are then connected to a routing point at a call center also hosted by the single client.

4. The outbound dialer system of claim 3 further comprising a computer-telephony integration (CTI) processor connected to the automatic call dialer, wherein the outbound dialer system is sponsored by a single client hosting a plurality of call centers, and wherein calls completed to persons are then connected to routing points at individual ones of the plurality of call centers based on pre-stored routing criteria.

5. The outbound dialer system of claim 4 wherein said completed calls are routed to individual call centers based on a load-balancing algorithm.

6. The outbound dialer system of claim 1 wherein the system further comprises a plurality of calling lists provided by a plurality of clients hosting call centers, and wherein the system places outbound calls from different calling lists, connecting calls completed to persons to call centers operated by the clients providing the calling lists.

7. A call center system, comprising:

at least one call center having a call-switching apparatus connected to a telephone network hosted by a network provider by at least one multi-channel telephony trunk line, and a plurality of agent stations having telephones connected by station-side ports to the call-switching apparatus, the at least one call center hosted by a client of the network provider; and an outbound dialer in the network implemented and operated by the network provider, the outbound dialer having the capability of placing calls to destination numbers selected from stored lists of destination numbers provided by the client, and circuitry for recognizing that at least one of said placed calls is answered by a person;

wherein the outbound dialer places said calls to the selected destination numbers, and upon one of said placed calls being answered by a person, connects the answered call to a routing point in the at least one call center.

8. The call center system of claim 7 wherein the network is a publicly-switched telephone network (PSTN).

9. The call center system of claim 7 wherein the outbound dialer system is hosted by a simple client of the network provider, and all of said calls answered by a person are connected to a routing point at the at least one call center.

10. The call center system of claim 7 further comprising a computer-telephony integration (CTI) processor connected to the outbound dialer and a plurality of call centers hosted by the single client, wherein said calls answered by a person are then connected to routing points at individual ones of the plurality of call centers based on pre-stored routing criteria.

11. The call center system of claim 10 wherein said answered calls are routed to individual call centers based on a load-balancing algorithm.

12. The call center system of claim 7 wherein the system further comprises a plurality of calling lists provided by a plurality of clients hosting call centers, and wherein the outbound dialer places outbound calls from different calling lists, connecting said calls answered by person to call centers operated by the clients providing the calling lists.

13. A method for minimizing the number of outgoing channels required for a call center having a plurality of agents and operating by outbound dialing, comprising steps of:

(a) providing, by the call center, one or more stored lists of destination numbers to be called to an automated outbound dialer implemented and operated by a network provider at network level;

(b) placing outbound calls by the automated outbound dialer in in the network servicing the call center, according to the list of destination numbers provided by the call center;

(c) determining when individual ones of said outbound calls are answered by a person; and (d) connecting said calls answered by a person to a routing point at the call center.

* * * * *